June 9, 1942. H. P. PHILLIPS 2,285,530

PISTON RING

Filed May 5, 1941

INVENTOR.
Harold P. Phillips
BY Earl H. Chappell
ATTORNEYS.

Patented June 9, 1942

2,285,530

UNITED STATES PATENT OFFICE 2,285,530

PISTON RING

Harold P. Phillips, Hastings, Mich., assignor to Hastings Manufacturing Company, Hastings, Mich.

Application May 5, 1941, Serial No. 391,924

4 Claims. (Cl. 309—45)

This invention relates to improvements in piston rings.

The main objects of this invention are:

First, to provide a composite piston ring assembly having a plurality of thin hard wear-resisting cylinder wall engaging members or segments maintained in proper relation to function with a high degree of independence and under high unit pressure to provide a highly effective oil ring for use in worn or tapered cylinders.

Second, to provide a ring assembly having these advantages or qualities which is quite economical in its parts.

Further objects pertaining to details and economies of the invention will definitely appear from the description to follow. The invention is defined in the claims.

A structure which embodies the features of my invention is clearly illustrated in the accompanying drawing, in which.

Figs. 3, 4, 5 and 7 are sectional views showing alternative embodiments or adaptations of my invention in piston ring assemblies, and in these figures no attempt has been made to show the parts in their proportions. It will be understood that the sectional views are considerably enlarged as compared to actual piston ring assemblies. However, certain parts of such assemblies vary in accordance with the dimensions of the grooves in which they are to be installed.

Figure 6:
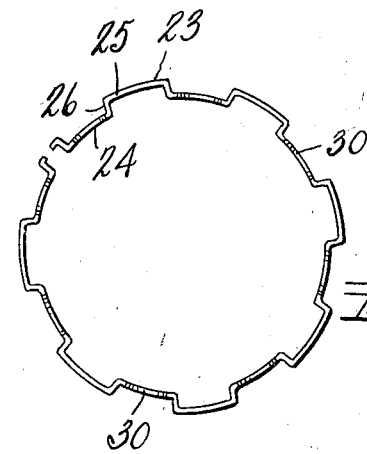

Fig. 6 is an edge view of one form of spacer which may be used with the assembly of my invention.

My present invention relates to the type of piston ring shown in my Patent 2,148,997, issued February 28, 1939. The piston ring assembly of that patent embodies split thin flat side members of ribbon steel or other wear resisting material in combination with an intermediate or spacer member and an expander acting upon the side members. My present invention is an improvement upon and refinement of the structure there illustrated, and also the structures illustrated in my copending applications, Serial No. 237,687, filed October 29, 1938, and Serial No. 323,273, filed March 11, 1940.

Referring to the drawing, the reference numeral 1 indicates the piston of an internal combustion engine and 2 the cylinder. The piston is provided with an oil ring groove 3 having drainage opening 5. The piston ring assembly is arranged in this oil ring groove and is designated generally by the numeral 4. As stated, no attempt has been made to show the parts in relative proportions or to show clearances, but it should be understood that when the piston ring assembly is assembled in the groove the clearances are such that all of the ring members are free for independent radial expansion and contraction.

Figure 1:
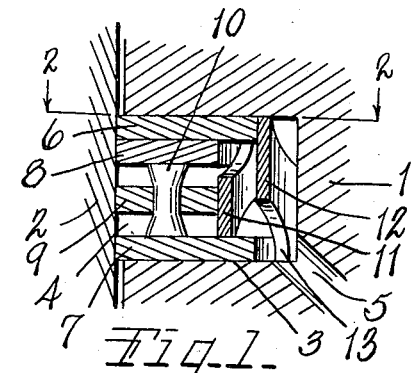
Fig. 1 is an enlarged fragmentary view in section on line I—I of Fig. 2 illustrating one embodiment of my invention installed in a piston ring groove and in operative relation to a cylinder wall, no attempt being made to show the parts in relative proportions or to illustrate clearance.
Figure 2:
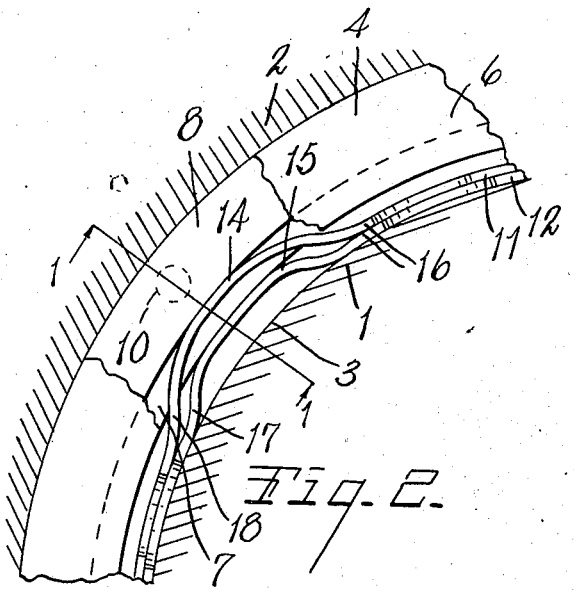
Fig. 2 is an enlarged fragmentary view in section on line 2—2 of Fig. 1, partially broken away, further illustrating structural features and the relation of parts.

In the embodiment of my invention illustrated in Figs. 1 and 2 the assembly comprises thin flat expansible side members 6 and 7 disposed to present their edges to a cylinder wall or adapted for edge engagement with a cylinder wall. These may be satisfactorily formed of ribbon steel and I have found them to be very effective when formed of stock about .024 of an inch in thickness.

Immediately below the upper side member 6 is an intermediate member 8, also of thin split ribbon steel or other wear resisting material, this intermediate member being disposed in side by side relation to the side member 6 and in spaced relation to the side member 7, but having free independent radial movement relative to both side members. This member is disposed to present its edge to the cylinder wall. It will be noted that it is of substantially less radial thickness or width than the side members.

I provide a spacer for maintaining the lower side member 7 and the intermediate member 8 in axially spaced relation and also to provide oil drainage between them. In the embodiment illustrated in Figs. 1 and 2, this spacer comprises an annular split spacer element of ribbon stock carrying a plurality of rivet-like members 10 extending from both sides thereof in spacing engagement with the intermediate member 8 and the side member 7. This spacer member is preferably of a softer material than the side and intermediate members as the softer material lends itself better to production—that is, the forming of the holes to receive the rivet-like members and the insertion and upsetting of the rivet-like members but it has the further advantage of wearing somewhat more rapidly than the intermediate member, thus insuring the desired action of the expander on the intermediate member. This spacer member or element 9 may be of the same but preferably should not materially exceed the radial dimension of the intermediate member and it will be noted that it presents its edge to the cylinder wall in the same manner as the other members 6, 7, and 8.

This arrangement of the spacing lugs 10 assures adequate ventilation, drainage spaces being provided between the spacer element 9, the intermediate member 8 and the side member 7. The members 6, 7, 8 and 9 are assembled for free independent radial movement. As stated, no attempt has been made to illustrate the clearance. All of these members ordinarily have some inherent expansibility or radial expansive action, but I provide independent expanders for the side members and the intermediate and spacer members.

In this preferred embodiment the expander 11 acts upon the intermediate member 8 and the spacer member 9 while the expander 12 acts upon the side members. These expanders are preferably in the form of annular split spring stock having ventilating notches or recesses 13 in the upper and lower edges thereof in substantially staggered relation. The inner expanding member 12 seats in the bottom of the groove 3 to act upon the side members. The outer expander 11 is reduced in axial width or dimension so that it may be disposed in the axial space between the side members. The expanders 11 and 12 are provided with circumferentially or annularly spaced crimps engaging the cylinder wall engaging elements and connecting the reaches. It will be noted that the crimps of the outer expander 18 are of greater radius and greater length than the crimps of the inner expander 17 which permits their being positioned in relatively nested relation without interfering with their free functioning. The connecting reaches 16 intermediate the crimps of the expanders are juxtaposed on one another, the reaches of the inner expander in effect constituting a shim on which the reaches of the outer expander rest. It is to be noted, however, that the expanding actions of the two members are independent in their effect or action on the ring members engaged thereby. As stated, the inner expander acts upon the side members while the outer expander acts upon the intermediate member and the spacer member. This insures the engagement of the cylinder wall by the members under high unit pressure, and this has been found to be highly effective, and the thin cylinder wall engaging members are of such material as to prevent excessive wear under high unit wall tension.

In practice it is necessary to shape the crimps of the respective expanding members with reference to one another in order to achieve the foregoing independence of action and so that there will be no interference. Thus, in Fig. 2 it will be noted that whereas the crimp 15 of the innermost member 12 joins the connecting reaches by relatively sharp bends 17, the crimp 14 of the outermost member 11 merges with the adjacent reach by a comparatively smooth continuous curve 18. Likewise in practice I find that it is desirable to install the two expanding members or rings 11, 12 with the gaps or splits thereof in axial alignment or register in order that, as the creep required for these rings to function takes place, it will be approximately in the same direction and in the same ratio and speed. If the splits were not installed in alignment there might be a damping or gripping action between the same, tending to paralyze the operation of one or both thereof.

It is also necessary or highly desirable to insure that the ventilating notches 13 of the respective inner expanding members 11, 12 are in angular or circumferential register in order that one of the members will not seal the other. I have illustrated this registry of the ventilating notches in the figures.

Figure 4:
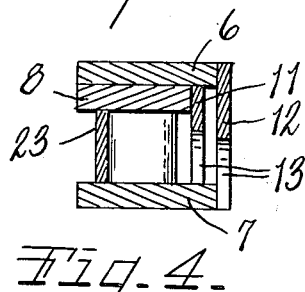

In Fig. 4 the spacer member 23 is in the form of a corrugated or bent strip of ribbon steel of suitable width to space the intermediate member 8 from the side member 7. This steel spacer member is corrugated or bent to zigzag form with alternate inner and outer reaches 24 and 25 connected by the relatively sharp radial bends 26. The resulting staggered portions or stepped portions provide effective and supporting engagement for the members between which the spacer is interposed. The expanders 11 and 12 are arranged in the same relation as in Figs. 1 and 2, although it will be noted that the expander 11 does not act upon the spacer other than that it may serve to center the same.

Figure 3:
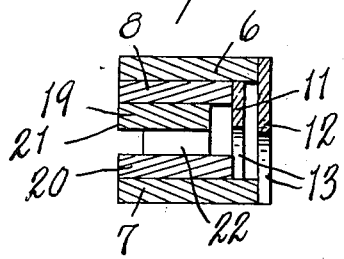

In the embodiment of my invention illustrated in Fig. 3 I provide a second intermediate member corresponding to the intermediate member 8 of the embodiment of Figs. 1 and 2, this second intermediate member 20 being arranged in side by side relation to the side member 7. In this embodiment the expander 11 acts upon the intermediate members. The spacer 19 is of cast iron provided with side ventilating openings 22. This cast iron spacer member is provided with a relatively narrow cylinder wall contacting rib 21. This spacer member is a live member, that is, it is urged against the cylinder wall by its inherent springiness or resilience. The cylinder wall engaging portion of the spacer member is preferably of about the thickness of the side and intermediate members, about .024 of an inch. In this embodiment the spacer member centers on the cylinder wall and does not engage the expander.

Figure 5:
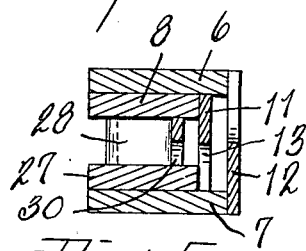
Figure 7:
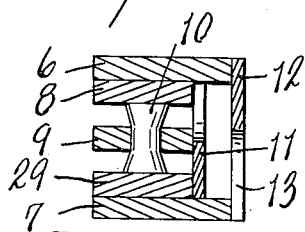

The embodiments shown in Figs. 5 and 7 both have two intermediate cylinder wall engaging members, the second intermediate member of Fig. 5 being designated by the numeral 27, while the second intermediate member in Fig. 7 is designated by the numeral 29. These structures are the same except for the spacers. In Fig. 5 the spacer is a corrugated steel structure, while in Fig. 7 the spacer is of the same type as illustrated in the embodiment of Figs. 1 and 2, namely, of ribbon steel provided with spacing lugs.

Piston ring assemblies embodying my invention are highly efficient in the control of oil and prevention of blow-by in worn or tapered cylinders. The structures are especially desirable for use as replacement rings. The cylinder wall contacting elements have complete independence and individuality of action, permitting adaptation to cylinder wall conditions, the outer members particularly having a "whiffle-tree" action whereby they follow tapered cylinders and effectively maintain wall contact. Further, they operate under the desired high unit pressure for the control of oil and reduction of blow-by.

Embodiments of the invention which incorporate the principles of the invention in a highly desirable manner have been illustrated and described. It should be understood that the foregoing terminology is used descriptively rather than in a limiting sense, and with full intention to include equivalents of the features shown and described, within the scope of the following claims.

Having thus described my invention, what I claim as new and desire to secure by Letters Patent is:

1. A composite piston ring assembly comprising spaced thin split flat side members disposed to present their edges to a cylinder wall, a thin split flat intermediate member disposed to present its edge to the cylinder wall and in side by side relation to one of said side members for independent radial movement thereto, a vented spacer disposed between said intermediate member and the other side member, an inner annular expander acting on said side members, and an outer annular expander acting on said intermediate member independently of the action of said inner expander on said side members, said side members, intermediate member and spacer member being associated for free independent radial movement.

2. A composite piston ring assembly comprising a pair of flat thin side members adapted for edge engagement with a cylinder wall, a flat thin intermediate member adapted for edge engagement with a cylinder wall disposed in side by side relation to one of said side members for independent radial action relative to said side member, a ventilated spacer disposed between said intermediate member and the other side member to maintain such side member in axially spaced relation to the intermediate and said one of said side members, and expanders acting independently on said intermediate and side members, said side and intermediate members and spacer being associated for free independent radial movement, said side members and intermediate member being of wear resisting material whereby to prevent excessive wear thereof under high unit wall tension.

3. A composite piston ring assembly comprising spaced thin flat side members disposed to present their edges to a cylinder wall, a pair of relatively spaceed thin split flat intermediate members disposed to present their edges to a cylinder wall and in side by side relation to said side members for independent radial movement relative to said side members and to each other, a ventilated spacer member disposed between said intermediate members, an expander acting on said side members to thrust the same against a cylinder wall, and a second expander acting on said intermediate members to thrust the same against a cylinder wall independently of the action of said first expander on said side members, said side and intermediate members and spacer member being associated for free independent radial movement and being of wear resisting material whereby to prevent excessive wear thereof under high unit wall tension.

4. A composite piston ring assembly comprising a pair of flat thin side members adapted for edge engagement with a cylinder wall, a pair of flat thin intermediate members adapted for edge engagement with a cylinder wall, said intermediate members being disposed in side by side relation to said side members for independent radial action relative to said side members, a ventilated spacer disposed between said intermediate members to maintain the pairs of side and intermediate members in axially spaced relation, an expander acting on said side members, and a second expander acting on said intermediate members, said side and intermediate members and spacer being associated with each other for independent radial movement, said side members and intermediate members being of wear resisting material whereby to prevent excessive wear thereof under high unit wall tension.

HAROLD P. PHILLIPS.